US012454856B2

(12) United States Patent
Connell

(10) Patent No.: US 12,454,856 B2
(45) Date of Patent: Oct. 28, 2025

(54) WINDOW CLOSING DEVICE

(71) Applicant: Jacob D. Connell, Neenah, WI (US)

(72) Inventor: Jacob D. Connell, Neenah, WI (US)

( * ) Notice: Subject to any disclaimer, the term of this patent is extended or adjusted under 35 U.S.C. 154(b) by 0 days.

(21) Appl. No.: 18/378,928

(22) Filed: Oct. 11, 2023

(65) Prior Publication Data

US 2025/0122757 A1 Apr. 17, 2025

(51) Int. Cl.
*E05F 15/665* (2015.01)
*E05F 15/71* (2015.01)

(52) U.S. Cl.
CPC ............ *E05F 15/665* (2015.01); *E05F 15/71* (2015.01); *E05Y 2600/52* (2013.01); *E05Y 2900/148* (2013.01)

(58) Field of Classification Search
CPC . E05F 15/71; E05Y 2600/52; E05Y 2900/148
USPC .......................................................... 49/358
See application file for complete search history.

(56) References Cited

U.S. PATENT DOCUMENTS

| | | | | |
|---|---|---|---|---|
| 1,825,043 A | | 9/1931 | Baltz, Jr. | |
| 1,870,992 A | | 8/1932 | Freuler | |
| 4,967,510 A | * | 11/1990 | Torii | E05F 15/689 49/362 |
| 6,578,248 B1 | * | 6/2003 | Boldizar | B25B 11/007 269/21 |
| 11,732,522 B2 | * | 8/2023 | Hall | E05F 15/67 49/362 |
| 2006/0042167 A1 | * | 3/2006 | Dedrich | E05F 15/689 49/358 |
| 2014/0121907 A1 | * | 5/2014 | Whinnery | B60J 7/0573 701/49 |
| 2019/0112860 A1 | * | 4/2019 | Urban | E05F 15/73 |

FOREIGN PATENT DOCUMENTS

| | | | | |
|---|---|---|---|---|
| CN | 201843456 A | | 5/2011 | |
| CN | 105871296 A | * | 8/2016 | B60J 1/17 |
| CN | 215520513 U | | 1/2022 | |
| CN | 115405192 U | | 11/2022 | |
| KR | 10-2018-0034939 A | | 4/2018 | |

* cited by examiner

*Primary Examiner* — Marcus Menezes
(74) *Attorney, Agent, or Firm* — Amundsen Davis, LLC

(57) ABSTRACT

A device for automatically closing a window includes a housing and a motor contained within the housing. An actuator is coupled to the motor and extends out from a portion of the housing. The actuator is configured to contact the window such that the actuator is able to close the window. A plurality of attachment elements disposed on a rear of the housing allow the device to be attached to a window.

20 Claims, 6 Drawing Sheets

WINDOW CLOSING DEVICE

FIELD OF THE INVENTION

The present invention relates generally to accessories used with windows. More specifically, the present invention relates to a window closing device that is able to be installed on multiple types of windows for use in automatically closing the window.

BACKGROUND OF THE INVENTION

Many people leave windows in their houses open during nice weather in order to get fresh air. However, a person may not want to have their windows open for long periods of time. If a person wants to close their window after a certain period of time or if it gets too hot or too cold, the person may need to be present in the home in order to shut the window at the desired time.

SUMMARY OF THE INVENTION

Having windows open allows homeowners to bring fresh air into their home, as well as assisting with temperature regulation. There may, however, be time when a homeowner does not want their windows to stay open for an unlimited periods of time. For example, a homeowner may wish to have their windows open for part of a day but have them closed later because inclement weather is predicted. Or, a homeowner may want their windows open until the outside weather either gets too warm or too cold to let the fresh air in.

Regardless of the reason that a homeowner may wish to close their windows after having them open, a homeowner is generally going to need to physically shut the windows. This means that a homeowner, or someone they designate, will need to be physically present in the home to close the windows. However, this may not allow a homeowner to close the windows when, for example, the outside temperature reaches a certain threshold temperature (whether a heat or a cold threshold). In addition, the homeowner is has to remain at the home until the amount of time they wanted to have the windows open has elapsed or until the temperature or other condition has been reached.

Electronic window closing devices provide a way for a homeowner to have the windows closed at a determined time, regardless of whether the homeowner is present. However, existing electronic window closing devices have limitations. The primary limitation is the specificity of the type of window that a device can be set up and used on. Although two pane, vertical sliding windows are common, many houses also have two pane horizontally sliding windows, single pane windows, or other varieties of windows. Many existing electronic window closing devices are only designed to work on a single variety of window. For example, a window closing device may only work on a two pane vertically sliding window, meaning that a homeowner with a combination of two pane vertical and two pane horizontally sliding windows would be required to purchase more than one style of window closing device, which can be a significant monetary investment. Moreover, existing window closing devices generally only work with a timer. Said differently, existing window closing devices allow a user to set the window to close after a period of time has elapsed. However, elapse of a period of time may not be the trigger a homeowner wants to rely on for windows being closed; instead, or in addition, the homeowner may want to have the window close when, for example, the outside temperature drops below or exceeds a predetermined threshold.

The window closing device of the present disclosure, by contrast, is able to be installed on multiple styles of window, making it much more universal. A housing includes a motor, with an actuator coupled thereto. The housing is able to be attached to any style of two pane window, provided that the actuator is able to contact the lower window frame, in the case of a vertical two-pane window, or the left-most or right-most window frame, in the case of a horizontal two-pane window. The housing, and thus the device, is removably attached to the window, allowing the window closing device of the present disclosure to be movable between windows depending on the needs of the user.

DETAILED DESCRIPTION

Figure 1:
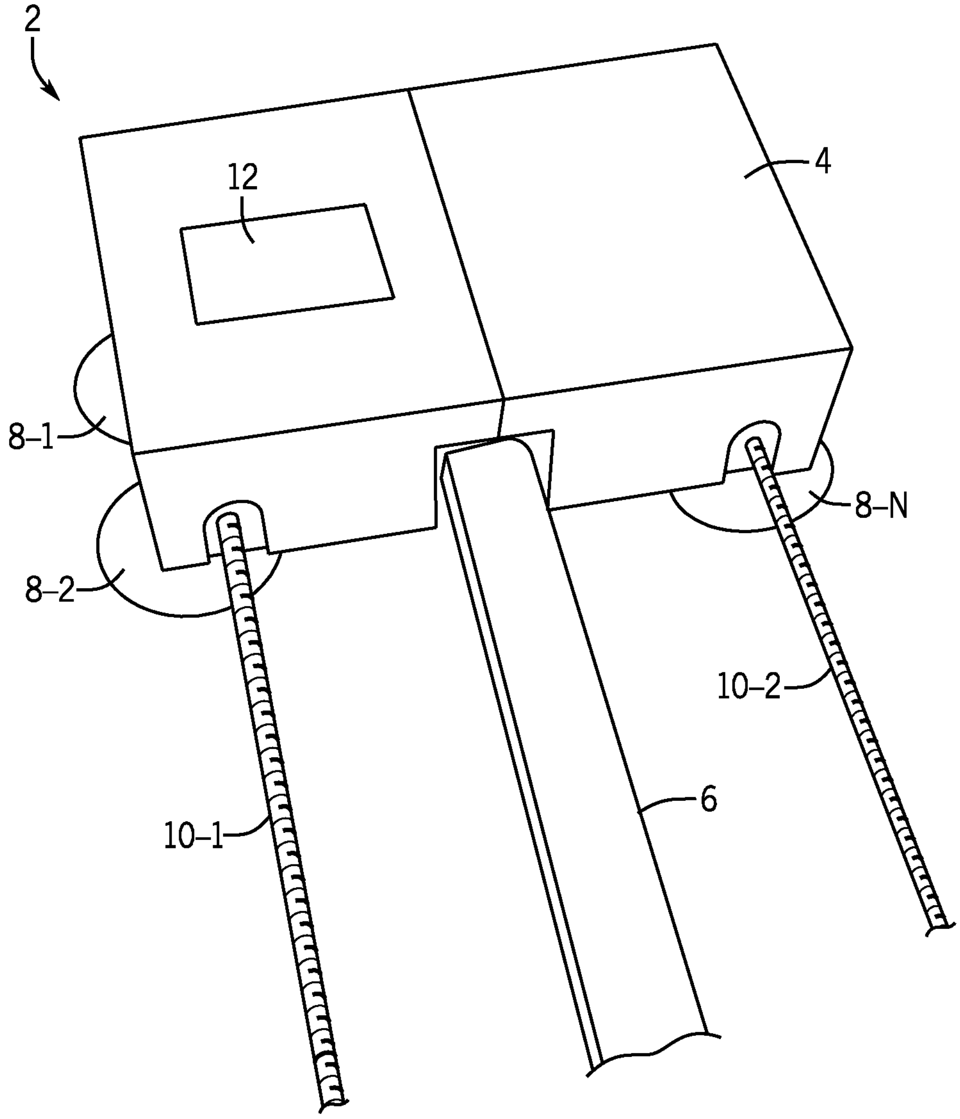
FIG. 1 is an example window closing device consistent with the present disclosure.
Figure 3:
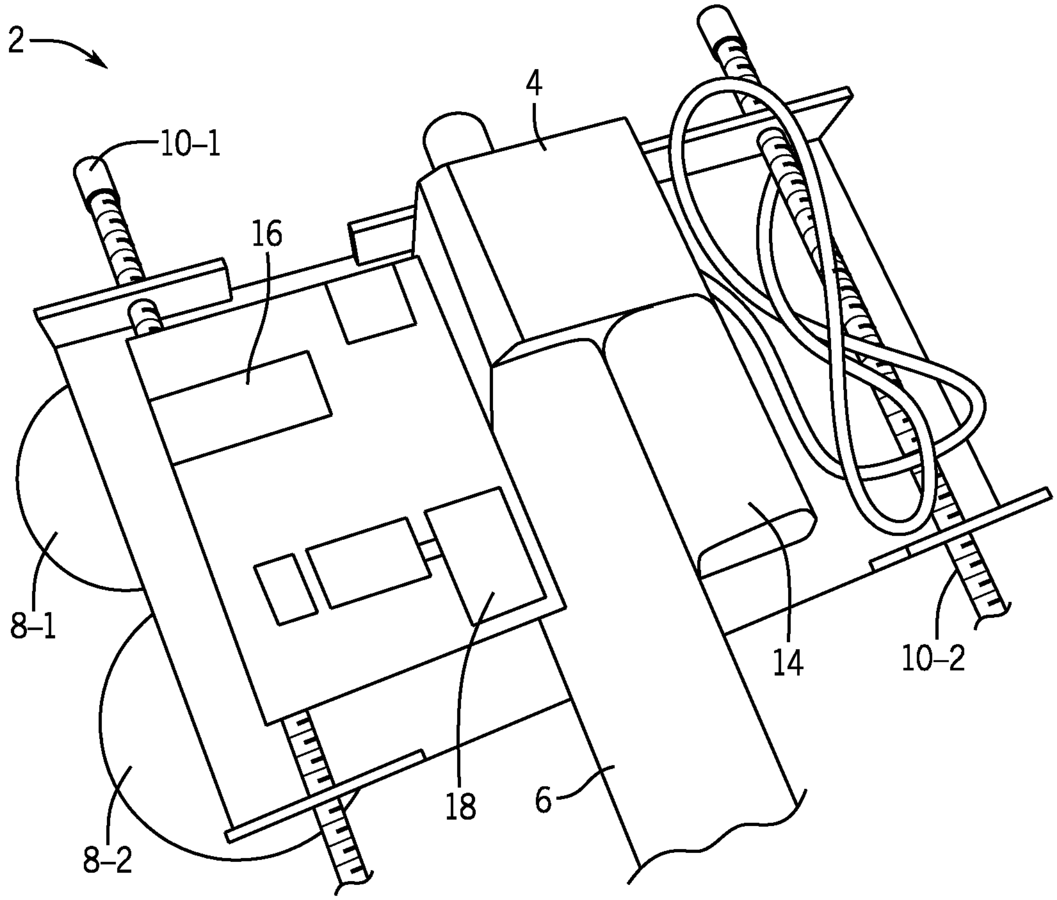
FIG. 3 is a view of the window closing device of FIG. 1 with the housing open to show internal components.

FIG. 1 depicts an example window closing device 2 consistent with the present disclosure. The window closing device 2 includes a housing 4, which may be made of metal, plastic, or any other suitable at least semi-rigid material. A motor may be contained within the housing 4. FIG. 3 shows the motor 14 contained within the housing 2.

Figure 2:
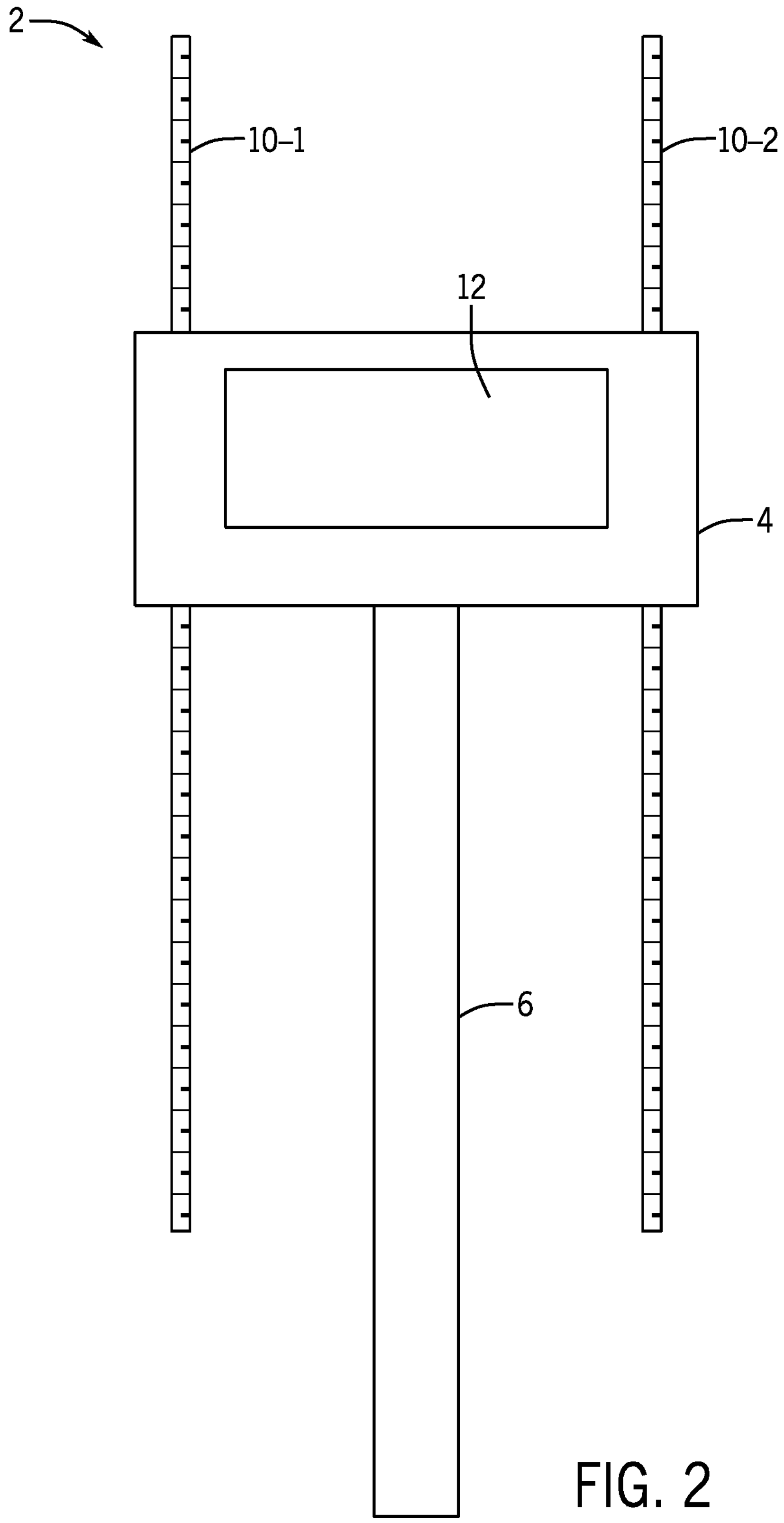
FIG. 2 is a front view of the window closing device of FIG. 1.
Figure 4A:
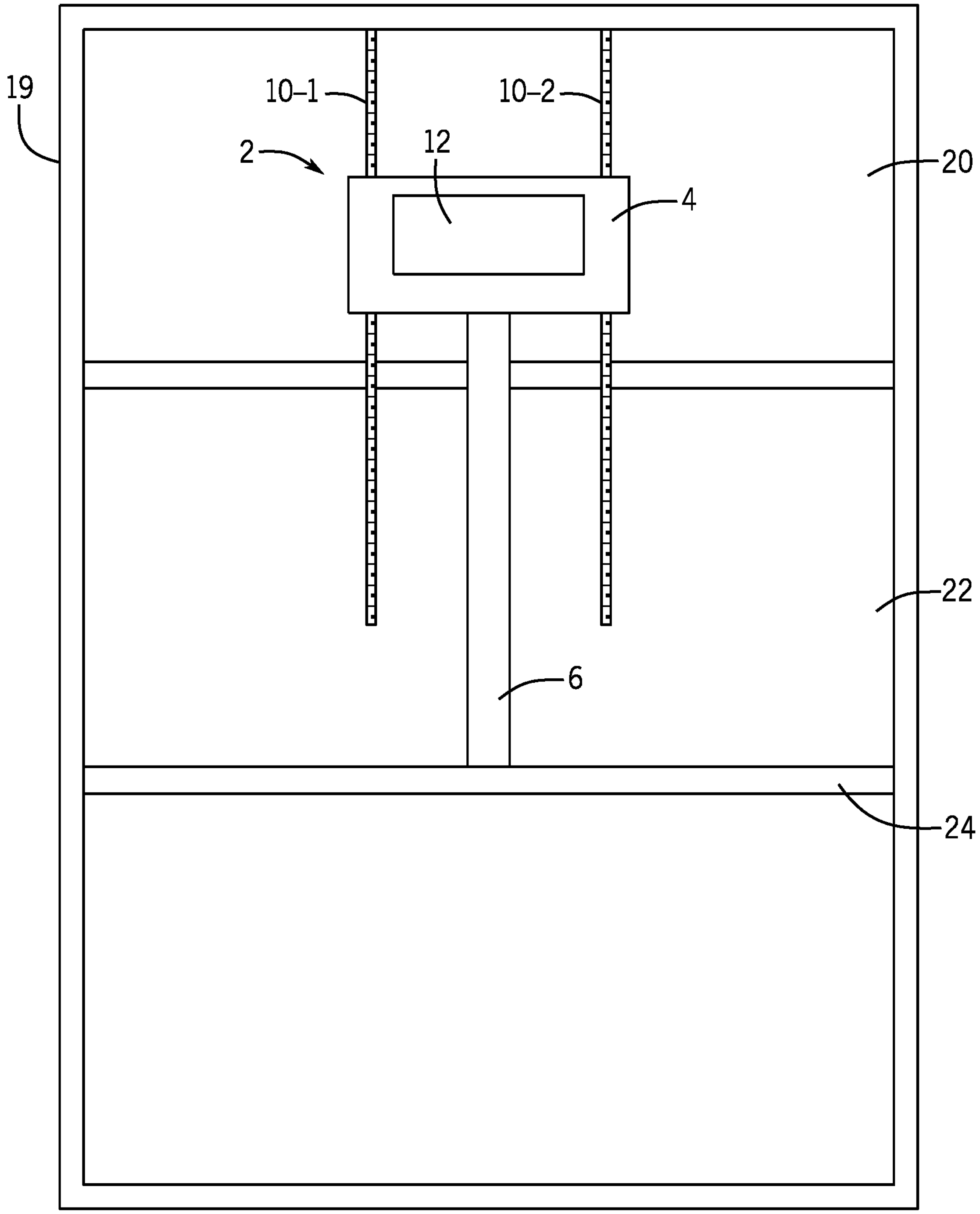
FIG. 4A is a view of the window closing device of FIG. 1 as installed on a window where the window is fully open.
Figure 4B:
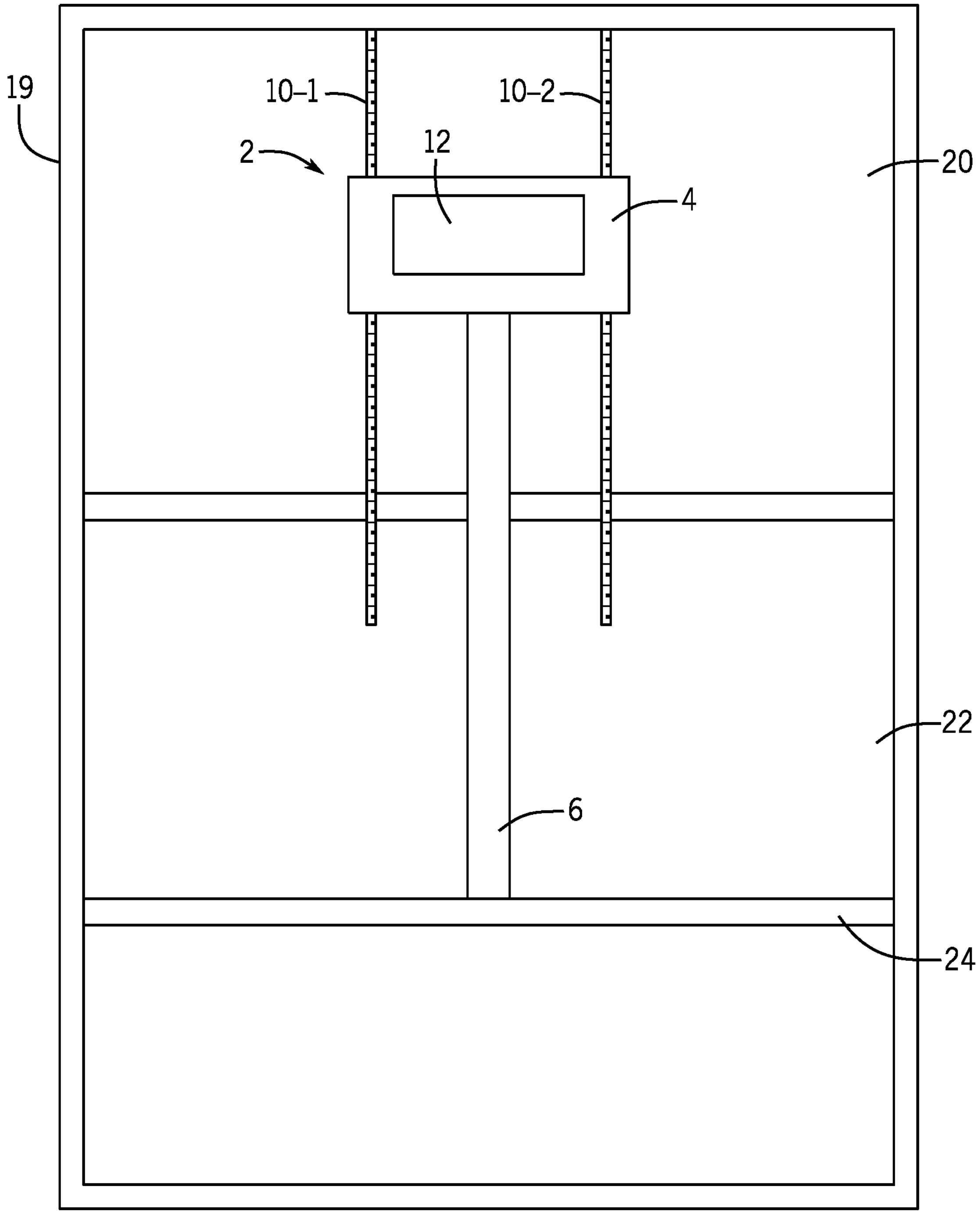
FIG. 4B shows the installation of FIG. 4A with the window closing device operating to move a movable window to a partly closed position.
Figure 4C:
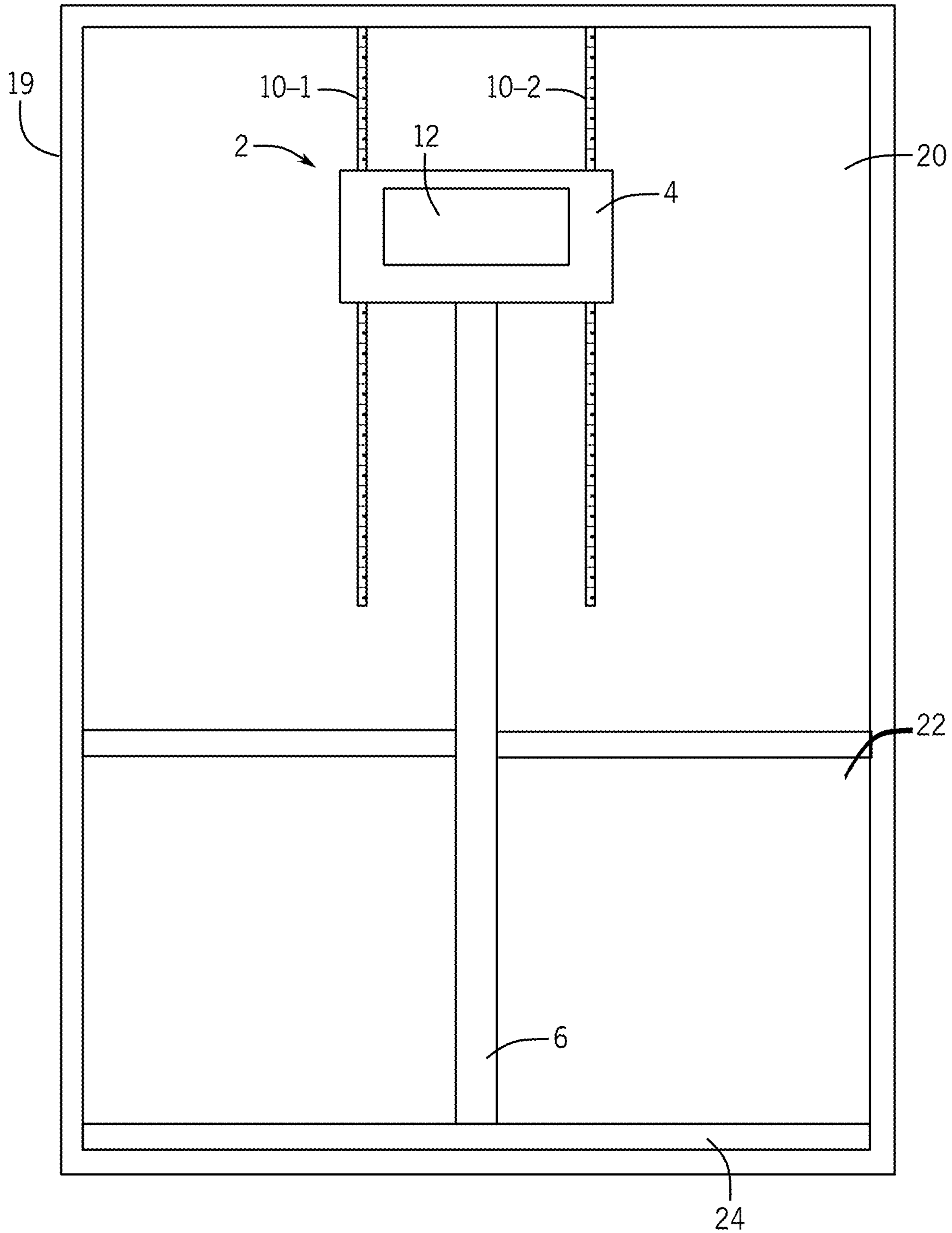
FIG. 4C shows the installation of FIG. 4A with the window closing device operating to move a movable window to a fully closed position.

An actuator 6 may be coupled to the motor 14 and extend out from a portion of the housing 4. As shown in FIG. 1, the actuator 6 may extend through an opening disposed in the housing 4. The actuator 6 may be movable between an extended position, as shown in FIGS. 1 and 2, and a retracted position. More particularly, the actuator 6 may be coupled to the motor 14. The motor 14 may then move the actuator 6 between the extended position and the retracted position. As shown in FIGS. 4A-4C, the actuator 6 may contact a lower portion 24 of a window 22 when in the extended position.

A plurality of attachment elements 8-1, 8-2 . . . 8-N (collectively, attachment elements 8) may be disposed on a rear of the housing. Although FIG. 1 shows the attachment elements 8 as suction cups, examples are not so limited and any suitable attachment elements may be used. The attachment elements 8 may be disposed in such a way as to allow the window closing device 2 to attach to a glass pane of a window. In some examples, the attachment elements 8 may be adjustable so as to allow components of the window closing device 2 to be adjusted. For example, the attachment elements 8 may be moved or adjusted to allow the distance between the window closing device 2 and an upper part of a two pane window to be adjusted.

The window closing device 2 may further include a plurality of rods 10-1, 10-2 (collectively, rods 10). The rods 10 may be threaded, notched, or include another mechanical means for adjusting the rods 10. Although two rods 10 are shown in FIGS. 1-3, examples are not so limited and other numbers of rods may be used. Rods 10 may extend through the housing 4, as shown in FIGS. 1-3. More particularly, as shown in FIG. 3, rods 10 may extend through housing 4 at openings in the housing 4. The threads, notches, or other mechanical means of adjustment included within the rods 10 may be used to adjust the rods 10 relative to the housing 4.

When the rods 10 are threaded, rods 10 may be adjustable in length by rotating the rods 10. Similarly, when the rods 10 are notched, rods 10 may be adjustable in length by moving the rods 10 relative to the housing 4. Said differently, the length of rods 10 may be adjusted to have greater length or lesser length extending from the upper portion of the housing 4. The length of rods 10 may be adjusted to allow rods 10 to contact an upper portion of a window frame when the window closing device 2 is installed on a vertical two-pane window. See FIGS. 4A-4C. When the window closing device 2 is installed on a horizontal two-pane window, the rods 10 may have their length adjusted to allow rods 10 to contact a left or a right portion of a window frame, with the side contacted being dependent on the direction the window opens. The rods 10 may provide tension against the frame of the window to provide further securement and stability for the window closing device 2.

In addition, a secondary securement mechanism may be used. The secondary securement mechanism may be a string tied to a stationary or secure location above the window on which the window closing device 2 is installed, although examples are not so limited and any secondary securement mechanism may be used. The secondary securement mechanism may be used to prevent the window closing device 2 from falling if the attachment elements 8 come loose.

A timer 12 may be contained within the housing 4. The timer may be in communication with the motor 14 and thus to the actuator 6. More particularly, the actuator 6 may move, by the motor 14, when a condition is met at the timer 12. In some examples, the condition may be elapsed time, as measured at a processor 16 contained within the housing 4, as shown in FIG. 3. In such examples, an amount of time may be input at the timer 12. Once the processor 16 determines that the input amount of time has elapsed (e.g., by determining that the timer has reached zero), processor 16 may cause the motor 14 to move the actuator 6, such that the actuator 6 shuts the window.

The window closing device 2 may further include a temperature sensor, which may be integrated with the timer 12. However, the temperature sensor may have a separate processor 18 contained within the housing, as shown in FIG. 3. The temperature sensor may be armed as the condition to be satisfied or met to cause the actuator 6 to be moved by the motor 14. In such examples, the temperature sensor may have a maximum or a minimum temperature input at the timer 12. The temperature sensor may then measure the temperature and determine, at processor 18, when the temperature exceeds the maximum temperature or drops below the minimum temperature. When processor 18 determines that the temperature condition has been met, processor 18 may cause the motor 14 to move the actuator 6, such that the actuator 6 shuts the window.

In some instances, both the timer and the temperature sensor may be armed. In such examples, the actuator 6 may be moved by the motor 14 when either processor 16 determines that the input amount of time has elapsed or when processor 18 determines that the maximum or minimum temperature has been reached at the temperature sensor. When the timer and the temperature sensor are both used, the actuator 6 will move in response to whichever condition is satisfied first.

The timer 12 may further include an input to adjust a force limit. The force limit controls the amount of force used by the actuator 6 to close the window. In some examples, the amount of force may be increased if the window requires more force to be closed or decreased if the window requires less force. Optimally, the force limit ranges between thirty pounds and sixty pounds. When the force limit is adjusted, the force limit should be set to the lowest force that is able to close the window.

FIGS. 4A-4C show the window closing device 2 as installed on a two pane window 19. Although the two pane window 19 is a vertically oriented window, examples are not so limited and horizontally oriented two pane windows may be used as well, with installation of the window closing device 2 being performed in substantially the same way. The window closing device 2 is installed on an upper pane 20 of the two pane window 19. Installation may include engaging a plurality of attachment elements, such as attachment elements 8, shown in FIGS. 1 and 3.

The rods 10 may then be adjusted by rotating or screwing them through the openings in housing 4. The rods 10 are adjusted such that the rods 10 contact a top portion of the two pane window 19. Specifically, as shown in FIGS. 4A-4C, the rods 10 contact the top portion of the upper pane 20. Once contact is made between the rods 10 and the top portion of the upper pane 20, the tension of the rods 10 may be adjusted by further rotating or screwing the rods until sufficient supporting tension is present between the rods 10 and the top of the window frame, with the housing 4 secured to the surface of upper pane 20.

Once the window closing device 2 is installed on the upper pane 20, a bottom window 22 of the two pane window 19 is opened. The lower portion 22 is opened far enough that a lower portion 24 of the bottom window 22 contacts the far end of actuator 6. As shown in FIG. 4A, the bottom window 22 is fully opened and the actuator 6 is in contact with the lower portion 24 of the bottom window 22.

The timer 12 contained within the housing 4 is accessible even when the bottom window 22 is opened, allowing the timer 12 to be armed. As previously discussed, the timer 12 may be armed by adjusting an amount of time to elapse and/or adjusting a temperature limit to be reached before activation of the actuator 6. In addition, a force limit may be adjusted at the timer 12.

FIG. 4B shows the window closing device 2 in the process of using the actuator 6 to close the bottom window 22. As shown in FIG. 4B, the actuator 6 remains in contact with the lower portion 24 of bottom window 22. The actuator 6 contacts the lower portion 24 of bottom window 22 until the bottom window 22 is fully shut, as shown in FIG. 4C.

In the foregoing detailed description of the present disclosure, reference is made to the accompanying drawings that form a part hereof, and in which are shown by way of illustration how examples of the disclosure may be practiced. These examples are described in sufficient detail to enable those of ordinary skill in the art to practice the examples of this disclosure, and it is to be understood that other examples may be utilized and that process and/or structural changes may be made without departing from the scope of the present disclosure.

Elements shown in the various figures can be added, exchanged, and/or eliminated so as to provide a number of additional examples of the present disclosure. In addition, the proportion and relative scale of the elements provided in the figures are intended to illustrate the examples of the present disclosure and should not be taken in a limiting sense.

What is claimed is:

1. A device for automatically closing a window of a building, comprising:
- a housing removably attachable to the window;
- a motor contained within the housing;
- an actuator coupled to the motor and extending out from a portion of the housing, wherein the actuator is configured to contact the window such that the actuator is able to close the window; wherein the actuator is movable and extendable between an extended position and a retracted position; and
- a plurality of attachment elements disposed on a rear of the housing wherein the plurality of attachment elements removably and temporarily attach the housing to only a glass pane of the window and whereby no part of the housing is attached to a frame of the window.

2. The device of claim 1, further comprising a plurality of rods extending through the housing and configured to contact the frame of the window to provide tension against the frame of the window and the housing.

3. The device of claim 1, further comprising a timer contained within the housing, wherein the timer is coupled to the motor and the actuator.

4. The device of claim 1, further comprising a temperature sensor contained within the housing, wherein:
- the temperature sensor is integrated with a timer; and
- the temperature sensor is coupled to the motor and the actuator.

5. The device of claim 1, wherein the plurality of attachment elements comprise a plurality of suction cups.

6. The device of claim 1, wherein a plurality of rods adjustably extend through the housing such that an upper portion of each of the plurality of rods contacts an upper portion of the frame of the window.

7. The device of claim 1, wherein the motor moves the actuator between the extended position and the retracted position.

8. The device of claim 1, wherein the actuator contacts a lower portion of the frame of the window when in the extended position.

9. A window closing device, comprising:
- a housing removably attachable to a window of a building;
- a motor contained within the housing;
- a timer contained within the housing and coupled to the motor;
- an actuator coupled to the motor and extending out from a portion of the housing, wherein:
  - the actuator is movable and extendable between an extended position and a retracted position; and
  - the actuator contacts a frame of the window when the actuator is in the extended position;
- a plurality of attachment elements disposed on a rear of the housing, wherein the plurality of attachment elements removably and temporarily attach the window closing device to only a glass pane of the window and whereby no part of the housing is attached to the frame of the window; and
- a plurality of stability rods extending through the housing, wherein an end of the stability rods contact with a portion of the frame of the window.

10. The window closing device of claim 9, further comprising a processor containing instructions executable to:
- determine that a condition has been met, wherein the condition is measured at the timer;
- move, by the motor, the actuator, wherein the movement of the actuator shuts the window.

11. The window closing device of claim 10, wherein the condition is at least one of elapsed time and measured temperature.

12. The window closing device of claim 9, wherein the device is attached to a two pane window.

13. The window closing device of claim 9, wherein the plurality of stability rods exert tension against a portion of the frame of the window when the end of the stability rods are in contact with the portion of the frame of the window.

14. The window closing device of claim 9, wherein the plurality of attachment elements are a plurality of suction cups.

15. A method for using a window closing device, comprising:
- installing the window closing device removably attachable to a two pane window of a building, wherein installing the window closing device further comprises:
  - extending a plurality of support rods to contact a top of a frame of the two pane window;
  - engaging a plurality of attachment elements removably and temporarily to only a glass pane of the two pane window and whereby no part of the housing is attached to the frame of the two pane window;
  - opening a bottom window of the two pane window such that the bottom window contacts a bottom portion of an actuator; and
- arming a timing device, wherein arming the timing device further comprises:
  - adjusting an amount of time to elapse before activation of the actuator, wherein the actuator is movable and extendable between an extended position and a retracted position;
  - adjusting a temperature limit to be reached before activation of the actuator; and
  - adjusting a force limit.

16. The method of claim 15, wherein installing the window closing device further comprises installing the window closing device on a vertically oriented two pane window.

17. The method of claim 15, wherein installing the window closing device further comprises installing the window closing device on a horizontally oriented two pane window.

18. The method of claim 15, wherein extending the plurality of support rods to contact a top of the frame of the two pane window further comprises adjusting an amount of tension being placed on the top of the frame of the two pane window.

19. The method of claim 15, wherein engaging the plurality of attachment elements further comprises moving the attachment elements to adjust a distance between the window closing device and an upper part of the two pane window.

20. The method of claim 15, further comprising engaging a secondary securement mechanism.

* * * * *